(12) United States Patent
Wuoti et al.

(10) Patent No.: US 9,063,208 B2
(45) Date of Patent: Jun. 23, 2015

(54) ASSISTED GLOBAL NAVIGATION SATELLITE SYSTEM FOR INDOOR POSITIONING

(75) Inventors: Tuomas Wuoti, Turku (FI); Björn Sjölund, Turku (FI); Gabriel Nyman, Mariehamm (FI); Niclas Jern, Turku (FI)

(73) Assignee: Walkbase Oy, Turku (FI)

( * ) Notice: Subject to any disclaimer, the term of this patent is extended or adjusted under 35 U.S.C. 154(b) by 438 days.

(21) Appl. No.: 13/491,555

(22) Filed: Jun. 7, 2012

(65) Prior Publication Data

US 2013/0328725 A1 Dec. 12, 2013

(51) Int. Cl.
*G01S 3/02* (2006.01)
*G01S 5/02* (2010.01)
*H04W 64/00* (2009.01)

(52) U.S. Cl.
CPC ............... *G01S 3/02* (2013.01); *G01S 5/0252* (2013.01); *H04W 64/00* (2013.01)

(58) Field of Classification Search
USPC .......... 342/357.21, 357.25, 357.42, 457, 458, 342/463; 455/456.1, 456.2
See application file for complete search history.

(56) References Cited

U.S. PATENT DOCUMENTS

| | | |
|---|---|---|
| 2008/0176583 A1 | 7/2008 | Brachet |
| 2010/0039929 A1 | 2/2010 | Cho |
| 2010/0109842 A1 | 5/2010 | Patel |
| 2010/0317372 A1 | 12/2010 | Wigren |
| 2011/0250904 A1 | 10/2011 | Valletta |
| 2013/0045759 A1* | 2/2013 | Smith ..................... 455/456.6 |
| 2013/0260771 A1* | 10/2013 | Wirola et al. ............... 455/446 |
| 2013/0265487 A1* | 10/2013 | Yu et al. ................... 348/383 |

OTHER PUBLICATIONS

Sanna, Giannina, et al., "Indoor Positioning in the Located Based Services", The International Archives of the Photogrammetry, Remote Sensing and Spatial Information Sciences. vol. XXXVII, Part B4. Beijing, 2008, pp. 931-936.
Gallagher, Thomas J., et al., "A Sector-Based Campus-Wide Indoor Positioning System", International Conference on Indoor Positioning and Indoor Navigation (IPIN), Sep. 15-17, 2010, Zürich, Switzerland, 8 pages.
Anwar, Al_Kateeb, et al., "Evaluation of indoor Location Based on combination of AGPS/HSGPS", 3rd International Symposium on Wireless Pervasive Computing, IEEE, May 7-9, 2008, pp. 383-387.

(Continued)

*Primary Examiner* — Dao Phan
(74) *Attorney, Agent, or Firm* — Ziegler IP Law Group, LLC.

(57) ABSTRACT

A method and a system for accurately positioning an electronic device located in an indoor area, generates a request signal for determining the indoor location of the device, and sends the signal to a server coupled to the device through a network. The request signal contains certain parameters pertaining thereto, including the signal strength, and the information of the cell towers through which the device sent the signal. The server uses the signal parameters to determine information pertaining to an approximate spatial position of the device, and sends and information to the device. Multiple positioning algorithms are embedded in the computing hardware of the device, and the device executes these algorithms to determine the exact indoor location thereof.

22 Claims, 4 Drawing Sheets

(56) References Cited

OTHER PUBLICATIONS

Zandbergen, Paul A., et al., "Positional Accuracy of Assisted GPS Data from High-Sensitivity GPS-Enabled Mobile Phones", The Journal of Navigation, The Royal Institute of Navigation, vol. 64, No. 03, Jul. 2011, pp. 382-399.

Navarro, Eduardo, et al., "Wi-Fi Localization Using RSSI Fingerprinting", Computer Engineering Department, Computer Engineering, 2010, pp. 1-6.

Dedes, George, et al., "Indoor GPS Positioning—Challenges and Opportunities", IEEE 62nd Vehicular Technology Conference, VTC-2005-Fall, vol. 01, Sep. 25-28, 2005, 4 pages.

\* cited by examiner

ASSISTED GLOBAL NAVIGATION SATELLITE SYSTEM FOR INDOOR POSITIONING

BACKGROUND

The present invention generally relates to navigation systems, and, more specifically, to global navigation satellite systems for positioning electronic devices.

Navigation systems and global positioning systems are widely used by electronic devices for determining their spatial locations. Global positioning systems are space-based satellite navigation systems, which provide the location information of a device, under any climatic conditions, irrespective of where ever the device is located on the Earth's surface. Specifically, a device is in communication with a configuration of GPS satellites revolving around the Earth, to identify its location. With a continuous unobstructed line of sight with four or more such GPS satellites, the device is capable of continuously determining its spatial location, including its coordinates (i.e., its latitude, longitude, etc.). More specifically, a GPS receiver embedded in an electronic device, precisely times signals received from GPS satellites revolving around the Earth, for example in geostationary orbit. Each GPS satellite continuously transmits messages that include information about the time when the message was transmitted, and the satellite's position at the time of transmission of the message. The electronic device uses these messages, computes the transit time of each message, and calculates its distance to the satellite. Eventually, certain algorithms and techniques like triangulation or trilateration are used by the device to determine the spatial location of its GPS receiver.

Conventionally, global navigation satellite systems (GNSS) are used by many electronic devices, including mobile devices, to determine their spatial locations. Measurement errors ranging within a few meters are provided by these systems, while depicting the position of the device on a map rendered on a display screen of the device.

In a case, for example, where a mobile device is located within an indoor area, many services and applications within the device may require detailed information pertaining to the indoor spatial location of the device, to function properly. In such cases, the conventional navigation systems require considerable time to determine precisely the position the device. Further, many GNSS systems are unable to operate indoors, and the GNSS data required for the functionality of GNSS system, cannot be recorded, when the device is located indoors. Consequently, all the data gathered, when the device is located indoors, is highly inaccurate, and does not provide accurate indoor spatial positioning results. Also, many indoor area maps are not available, and this creates another major obstruction in determining a position of a device located indoors, as there are no points of reference available.

Therefore, considering the aforementioned problems, there exists a need for an effective and accurate method and a system for determining a position of a device located in an indoor area.

SUMMARY

The present disclosure provides an assisted global navigation satellite system and a method, which accurately identifies and determines the exact spatial location of an electronic device located in an indoor area. The system and the method do not require the electronic device to have a constant data connection, for determining the indoor location of the device.

In an aspect, the present disclosure provides a method of determining the spatial positional of an electronic device located in an indoor area. The method sends a request signal from the electronic device to a server arrangement, for determining the spatial position of the device. The request signal is sent through a number of cell towers, and a wireless network through which the device connects to the server. The signal contains information pertaining to the cell towers and certain parameters pertaining to the strength of the signal. The server receives the request signal, processes it, and generates data pertaining to determination of the spatial position of the device. The method communicates this data to the electronic device. The device uses this data, processes it through a set of pre-determined algorithms embedded within its computing hardware, and determines its spatial position. Specifically, Wi-Fi localization techniques are used, and Wi-Fi fingerprinting data corresponding to the access points of the wireless networks through which the device connects to the server, is sent to the server. The Wi-Fi fingerprinting data is used to generate the data pertaining to determination of the spatial position.

In another aspect, the present disclosure provides a system including an electronic device located within an indoor area, and a server coupled to the electronic device. The server is in wireless communication with the device, through a wireless network. The device generates a request signal for determining its spatial position, and sends the signal to the server. The request signal contains information pertaining to certain signal parameters, including the signal strength and the Wi-Fi fingerprinting data corresponding to access points of the wireless network through which the device connects to the server. The server processes this signal to generate data pertaining to the spatial location of the device, and sends the data to the device. The device has multiple pre-determined algorithms embedded in its computing hardware, which it executes to determine its indoor spatial location, after receiving the data from the server.

The system and the method eliminates a need for a constant unlink data connection of the electronic device with the server, and accurately determines its indoor spatial location.

Additional aspects, advantages, features and objects of the present disclosure would be made apparent from the drawings and the detailed description of the illustrative embodiments construed in conjunction with the appended claims that follow.

DETAILED DESCRIPTION OF ILLUSTRATIVE EMBODIMENTS

The following detailed description discloses aspects of the claimed invention and the ways it can be implemented. However, the description is not intended to define or limit the invention, such definition or limitation being solely contained in the claims appended thereto. Although the best mode of carrying out the invention has been disclosed comprehensively, those in the art would recognize that other embodiments for carrying out or practicing the invention are also possible.

Navigation systems, including global positioning systems (GPS), are widely used for determining a spatial location of a device, located anywhere on the Earth's surface, in terms of its latitude, longitude, and its exact position depicted over a map. Navigation systems are in continuous communication with plurality of GPS satellites revolving around the Earth, for example in geostationary orbit around the Earth. Further, these systems use different commonly known techniques, such as triangulation and trilateration, for determining location. In a case where an electronic device is located in an indoor region, identifying its location precisely, through the conventional navigation systems, become difficult. Many reasons lay behind this fact, including unavailability of information about indoor locations, for example, the indoor maps, and hence, there is a lack of reference points for the systems to determine the indoor location. Attempts have been made in the art in this respect; however, none of them has been substantially successful.

The present disclosure pertains to an assisted global navigation satellite system (A-GNSS) (some times referred as Assisted Global Positioning System i.e. A-GPS) for accurately positioning an electronic device located in an indoor area. The system uses signal strength parameters and Wi-Fi fingerprinting data pertaining to the signals transmitted by the device to a server, and uses this information to determine its indoor location. Further, the system eliminates a need for a constant uplink data connection between the device and the server, for determining its indoor location.

Figure 1:
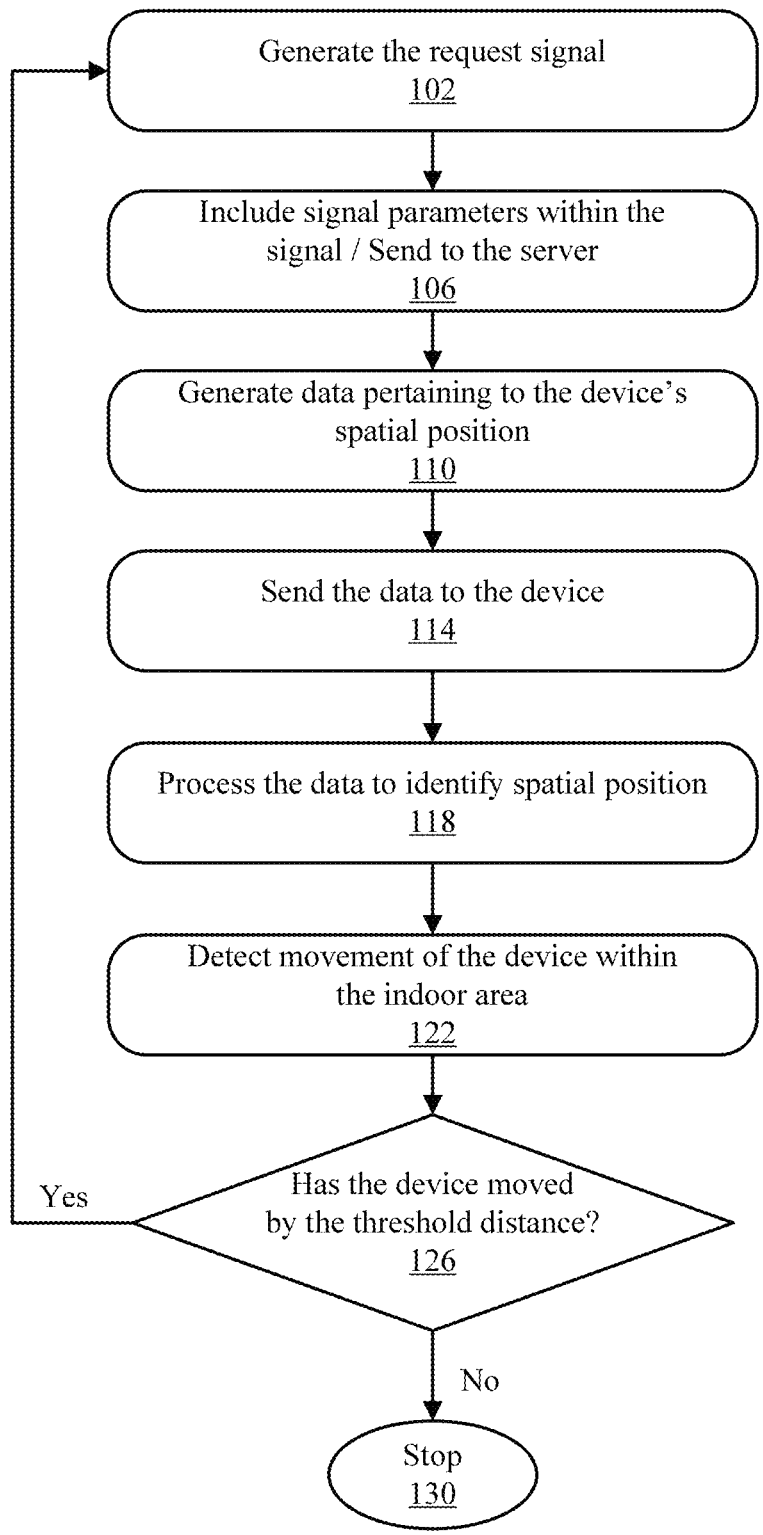
FIG. 1 illustrates a flow diagram for a method of positioning an electronic device located in an indoor area, in accordance with the present disclosure.

FIG. 1 illustrates an exemplary method of determining a location of an electronic device located in an indoor area, in accordance with the present disclosure. The electronic device may be, for example, a mobile phone, an iPad, a smart phone, including Apple's iPhone®, an Android Phone®, a Symbian Phone®, etc. The device is connected to a server through a wireless network, and a number of cell towers. The network may be any suitable network, including a Wireless Local Area Network, Wi-Fi Network, a 3G network or a 2G network, etc. At a step 102, the method generates a request through the electronic device located in the indoor area, for determining the spatial position of the device. The generated request contains information pertaining to the signal strength, for example, a received signal strength indicator (RSSI), and the Wireless access points data pertaining to the signal, and the Wi-Fi fingerprinting data corresponding to the signal. Those in the art will understand that the Wi-Fi localization technique is now used to identify locations where GPS positioning systems fail, due to signal breaking and other reasons, specifically when a device is located in an indoor region. Further, Wi-Fi localization through fingerprinting techniques uses a probability distribution of the signal strengths at a specific location and uses a map of these probability distributions to identify the location. Specifically, Wi-Fi fingerprinting creates a radio map of a given area through the RSSI data obtained for several access points, and creates a probability distribution of the RSSI values for the given location. These RSSI values are then compared with the fingerprint to identify the closest match, and predict of the location coordinates of the given location.

At a step 106, the signal parameters, as aforementioned, are included in the generated request signal, and the device sends the signal to the server, through the wireless network. At a step 110, the server, after receiving the signal, generates data pertaining to the spatial position of the device. The data may include the approximate spatial coordinates of the device, including its latitude, longitude, etc. Specifically, the server has a location database that stores information pertaining to different locations. In an embodiment, the location database includes spatial location coordinates corresponding to different signal parameters, for example the RSSI, etc. The server, after receiving the request signal, uses the associated signal parameters and searches the database for the spatial coordinates corresponding to the signal parameters. For this, a search crawler within the location database crawls through the different entries in the database, and retrieves the relevant spatial location corresponding to the signal parameters, by matching it with each entry within the database one by one. Further, at a step 110, the server also creates a customized database of the Wireless access point data relevant to the identified location. For example, if the wireless network connecting the device to the server is a WLAN network, then the customized database may include the WLAN Access point data (WLAN-AP) relevant to the location. Specifically, the network packets sent to the different wireless access points, while the device communicates within the server through the network, are tracked, and continuously maintained as a record within the server. Conventional techniques for identifying and gathering the Wireless access points data pertaining to the location include using the Media Access control (MAC) filtering.

At a step 114, the server sends the data pertaining to the spatial location to the device. The server also sends the customized database containing data related to the wireless access points, as aforementioned, to the device. At a step 118, the device processes the received information to identify its exact indoor spatial position. Specifically, the device has a set of pre-determined algorithms stored within its computing hardware, and it uses these algorithms to process the received information. An indoor location database is stored in the computing hardware of the device, which contains information relevant to different indoor locations. Specifically, the indoor location database contains information pertaining to different possible indoor locations proximal to different spatial positions, as could be identified by the server at the step 110. The algorithms within the device, when executed, match the spatial position as identified by the server, with the different indoor locations within the indoor location database. The most proximal indoor location, found on matching, is construed as the exact indoor spatial position of the device. This identified indoor spatial position is much more accurate than the case where it would have been determined by a conventional global positioning system or a global navigation satellite system, due to persistent problems including signal breakage, as the device is located indoors.

At a step 122, the method includes continuously detecting movement of the device by a pre-determined threshold distance within the indoor location. The pre-determined distance may be user adjustable, and can be within a range of 10 to 20 meters in an embodiment. Specifically, the electronic device located indoors, may have a motion detection module incorporated within it, to identify a change in stationary state, or a sudden motion of the device. If such a movement is identified, then the method includes moving back to the step 102 and generating a new request signal for determining its shifted indoor location. The following steps after this remain the same as described above. In this manner, the method continuously updates the current indoor location of the device, even if the device is found to move within the indoor area, from one location to another.

Figure 2:
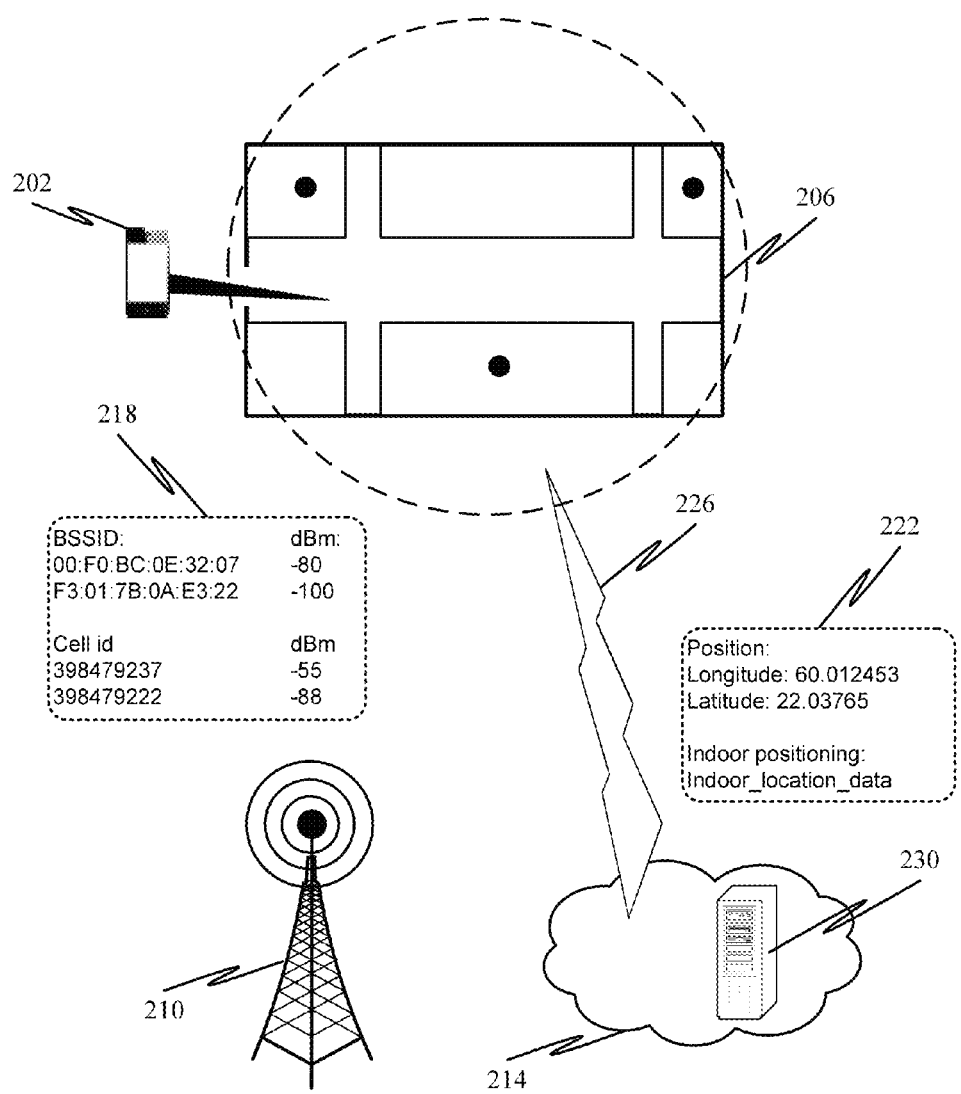
FIG. 2 shows an electronic device located in an indoor area and communicating with a server through a network, to determine its location, in accordance with the present disclosure.

FIG. 2 illustrates an electronic device 202 located within an indoor area 206, and communicating with a server 214 for determining its indoor location, in accordance with the present disclosure. The indoor area 206 can be a residential building, an office premises, a closed theatre, etc. The device 202 communicates with the server 214 through a suitable wireless network 226, which may be a Wireless Local Area network (WLAN), a Wi-Fi network, etc. Further, as aforementioned, the electronic device may be a mobile phone, including a smart phone, for example, an iPhone®, a Symbian Phone®, an Android Phone®, an iPad, etc. Preferably, the server 214 is a cloud server. Those in the art will understand that a cloud computing service connects devices with certain central remote servers through the contemporary Internet. For identifying its accurate indoor spatial position, the device 202 generates a request signal containing parameters such as the signal's strength, which may be a received signal strength indicator (RSSI) for the signal, as aforementioned. The request signal may contain other additional information pertaining thereto, for example, data 218, as shown, which contains the cell ID for the device, and the basic service set identification (BSSID), which may be the Media access control (MAC) address for the wireless access points through which the device connects to the server 214. Further, the parameters may include information pertaining to the cell tower 210 through which the request signal is routed to the server 214. The server 214 has a location database 230, which contains location information, for example, the spatial coordinates, longitude and latitude for different locations. In an embodiment, the database 230 contains location information pertaining to a variety of signal strength parameters, aligned with the parameters. On receiving the request signal, the server 214 retrieves the signal strength parameters therefrom, and determines the corresponding location of the device, from the database 230. Specifically, a search crawler within the database 230 searches through the different entries within the database 230, and finds the matching entry for the received signal strength parameters. Following this, once the location information for the device is retrieved, the server 214 provides this information to the device 202. The device 202 has different indoor positioning algorithms embedded within its computing hardware. On receiving the location information from the server 214, the device 202 uses these algorithms, to process the location information, and to identify its exact indoor spatial position. As shown, an information set 222 is eventually generated by the device 202, after processing the location information. The information set 222 contains the general information, including the spatial coordinates, longitude and latitude of the device 212, appended with the additional indoor location pertaining to the indoor area 206 where the device 202 is located. Specifically, for example, the indoor location data within the information set 222 may be the building number, house no., list of companies close by, tags, additional information such as advertisements, general information related to location and indoor areas, information related to Wi-Fi fingerprints, mapping of Wi-Fi fingerprints with rooms/areas/shops, etc., pertaining to the indoor area 206. In an embodiment said information set 222 is sent as part of A-GPS message.

In a preferable embodiment, the system uses Wi-Fi localization techniques through Wi-Fi fingerprinting data, to determine the indoor spatial position of the device 202. Specifically, Wi-Fi fingerprinting data corresponding to the wireless access points through which the device 202 connects to the server 214, for example Wireless Local Area Network Access points (WLAN-AP), if the network 226 is a WLAN network, is used to identify the indoor spatial position of the device 202.

Figure 3:
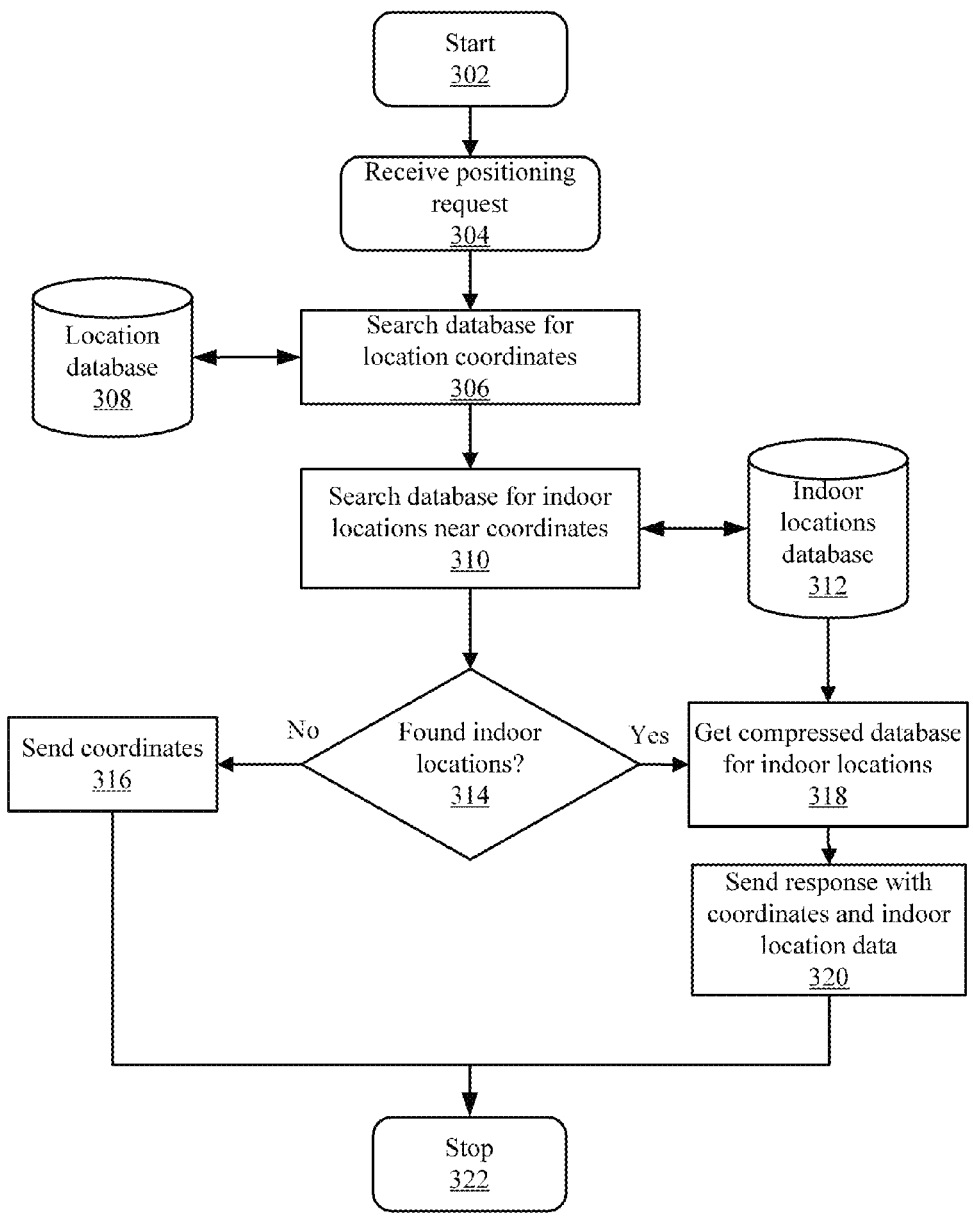
FIG. 3 illustrates a flow diagram depicting how a server connected to a device, handles a positioning request from the device, to determine its indoor location.

FIG. 3 illustrates manner in which a cloud server handles a request from an electronic device, to determine its location, in accordance with the present disclosure. The method starts at a step 302, and at a step 304, the cloud server receives a positioning request in the form of a request signal from the device. The positioning request can be for example request for A-GPS information. At a step 306, the cloud server searches through a location database 308 thereof, to identify at least coarse location coordinates of the device, as aforementioned. The identification of the coarse location can be derived for example for example by mapping cell ID to the location or by comparing sent Wi-Fi related parameters. Additionally the system can be configured to use last known GPS position as the initial location. At a step 310, an indoor location database 312 is searched for identifying indoor locations proximal to the location coordinates identified at the step 306. The closest identified indoor locations, among the entries within the indoor location database 312, are construed as the possible indoor locations of the device. At a step 314, it is checked whether any indoor locations corresponding to the location coordinates are found. If yes, then at a step 318, cloud server gathers all such indoor locations to prepare a compressed database of indoor locations. Eventually, at a step 320, the cloud server sends the compressed database of indoor locations, and the location coordinates identified at the step 306, to the device. Sent compressed database of indoor locations includes in preferred embodiment Wi-Fi finger print data mapping to GPS co-ordinates (within indoor location). Example mapping (or part of sent information to the terminal) is illustrated in TABLE I. Said mapping of Wi-Fi finger print data to geographical co-ordinates can be used by the GPS device to output co-ordinates without receiving full or even any signal from GPS satellites. Else, if no indoor locations corresponding to the location coordinates are found at the step 314, then, as shown at a step 316, the cloud server merely sends the location coordinates to the device. The electronic device maintains a cache of identified indoor locations, with time, as sent by the cloud server, and keeps them within its own database of indoor locations, for further reference later. Such a database may be retained within the computing hardware of the device, in an embodiment. Moreover, such database may contain data for nearby locations corresponding to different identified indoor locations too. This enables the device to calculate its indoor location later, without maintaining a constant uplink data connection with the cloud server.

TABLE I

| | Wi-Fi Information | Longitude | Latitude | Height from sea level | Other indoor location data |
|---|---|---|---|---|---|
| 1 | BSSIS:<br>00:A0:C9:14:C8:29 | 60.012231 | 22.03423 | 100 meters | "Sky bar"<br>"Happy hour 16-18" |

TABLE I-continued

| | Wi-Fi Information | Longitude | Latitude | Height from sea level | Other indoor location data |
|---|---|---|---|---|---|
| 2 | BSSID: 00:F0:BC:0E:32:07 dBM:-80 BSSID: F3:01:7B:0A:E3:22 dbM:-100 | 60.0123453 | 22.03765 | 30 meters | "Lobby" "www.example.com" "phone number: 01-123456" "email: joe@example.com" |
| 3 | BSSID: 00:F0:BC:0E:32:07 dBM:-100 BSSID: F3:01:7B:0A:E3:22 dbM:-50 | 60.0223453 | 22.03234 | 30 meters | "Cafeteria" "Open 9:00-15:00" "TAG: #coke, #burger" |

Figure 4:
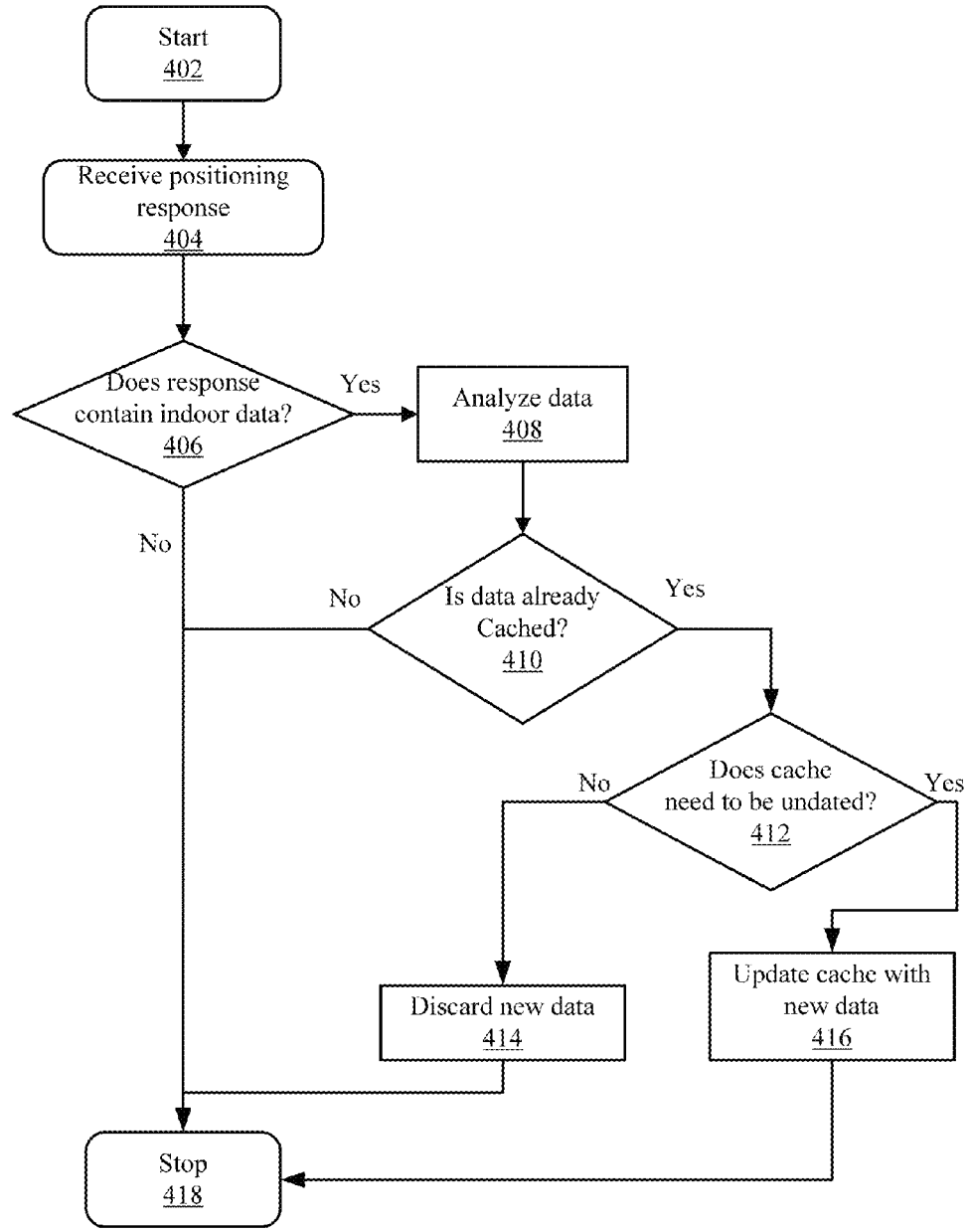
FIG. 4 illustrates the process through which the electronic device maintains a cache of the received location information from the server, with time, in accordance with the present disclosure.

In an embodiment, on identifying the location coordinates of the device, the server sends a customized database of wireless access points data pertaining to the location of the device, to the device. FIG. 4 illustrates a manner in which the electronic device handles a customized database of indoor locations, received from the cloud server, and maintains a cache of the received indoor location information from the server, with time. Starting at a step 402, the device receives a positioning response from the cloud server at a step 404, after the cloud server has processed the request signal received from the device, for positioning the device. At a step 406, on receiving the positioning response from the server (i.e., the location coordinates of the device, as identified after receiving the request signal), the device analyzes the response and checks whether the response contains any indoor location data. If yes, then at a step 408, the device analyzes the data, and at a step 410, the device checks whether the received data is already cached. If yes, then at a step 412, the device further checks whether the cache needs to be updated. Eventually, if required to be updated, then at a step 416, the device updates the cache with new data. Else, if not required to be updated, then, as shown, at a step 414, the method discards the new data. As mentioned earlier, this enables the device to determine its exact indoor location later on, through the indoor location database where it maintains a cache of indoor locations, without having a constant uplink data connection with the server.

The method and the system of the present disclosure, for determining the indoor location of an electronic device, accurately positions the device, identifies its indoor location information, and alleviates the problems conventionally faced by the existing global positioning systems and global satellite navigating systems, while positioning a device located indoors, due to signal breakage indoors, and other associated reasons.

Although, the exemplary method and system of the present disclosure has been described for the case when a single electronic device is communicating with a cloud server, the method and the system is also implementable for multiple electronic devices located within same or different indoor locations, and connected to one or more cloud servers through suitable wireless networks. Further, though only one cloud server has been illustrated, in an embodiment, multiple cloud servers can communicate with the different electronic devices through different networks, to determine their respective indoor locations.

Although the present invention has been described comprehensively, in considerable details to cover the possible aspects and embodiments, those skilled in the art would recognize that other versions of the invention may also be possible.

What is claimed is:

1. A method of determining the spatial position of an electronic device located in an indoor area, the method comprising:
    sending a request signal through the electronic device, for determining the spatial position of the electronic device, to a server arrangement, through a plurality of cell towers and a wireless network, the request signal containing information related to the cell towers and parameters pertaining to a strength of the request signal;
    receiving the request signal at the server arrangement;
    processing the received request signal in the server arrangement and matching the information and parameters of the received request signal to stored spatial coordinates and generating spatial coordinate data from the spatial coordinates pertaining to the spatial position of the electronic device; and
    communicating the spatial coordinate data to the electronic device, and using the electronic device to process the spatial coordinate data for determining the spatial position by matching the spatial coordinate data to indoor location data stored in the electronic device, wherein the determined spatial position is an indoor location obtained from the indoor location data, wherein the electronic device is further configured to:
    generate an information set that comprises the spatial coordinate information of the indoor location and one or more of a building number, a house number, a list of companies nearby and advertisement information.

2. A method of claim 1, wherein the request signal contains a received signal strength indicator pertaining thereto.

3. A method of claim 1, further comprising, using Wi-Fi localization technique by providing fingerprinting data corresponding to the wireless network, to the server, and using the finger printing data to generate spatial position of the device.

4. A method of claim 1, wherein server arrangement is a cloud server arrangement.

5. A method of claim 1, further comprising, using a set of pre-determined algorithms embedded within the electronic device, to process the data and to determine the spatial position.

6. A method of claim 1, further comprising, continuously maintaining a log of the data sent to the electronic device, in a database of the device.

7. A method of claim 6, wherein the sent data includes a timestamp, specifying the time of generation of the data.

8. A method of claim 1, further comprising, generating the request signal based on movement of the device by a pre-determined threshold distance, within the indoor area.

9. A method of claim 1, further comprising sending the request signal through a non-constant uplink communication service.

10. An electronic device having a computing hardware, and a software application stored in the computing hardware, the software application being executable on the computing hardware to implement the method of claim 1.

11. A software product recorded on a machine readable data storage medium, the software product being executable on the computing hardware of a computing device, for implementing a method of claim 1.

12. A method of claim 1, wherein the electronic device is one of a mobile phone, a smart phone, an iPad and a personal digital assistant.

13. A method of claim 1, wherein the electronic device is a wireless communication device.

14. A system comprising:
an electronic device located within an indoor area, and configured to generate a request signal corresponding to determination of a spatial location of the electronic device;
a server coupled to, and in wireless communication with the electronic device, through a wireless network, the server being configured to:
receive the request signal, the request signal containing information pertaining to parameters of the request signal;
process the signal to generate spatial coordinate data pertaining to the spatial location of the electronic device by matching the request signal to a stored spatial coordinate, and send the spatial coordinate data to the electronic device, wherein:
the electronic device includes a set of pre-determined algorithms embedded in a computing hardware thereof, the electronic device being operable to execute the algorithms, after receiving the spatial coordinate data and match the spatial coordinate data to an indoor location from a list of indoor locations stored in the device, to determine the spatial location thereof and generate an information set that comprises the spatial coordinate information of the indoor location and one or more of a building number, a house number, a list of companies nearby and advertisement information.

15. A system of claim 14, wherein the signal parameters include a received signal strength indicator pertaining to the signal.

16. A system of claim 14, wherein the server is a cloud based server.

17. A system of claim 14, wherein the electronic device has a set of pre-determined algorithms embedded in a computing hardware thereof, the device being configured to use these algorithms to process the data and determine the spatial position.

18. A system of claim 14, wherein the electronic device is configured to generate the request signal based on the movement of the device by a pre-determined threshold distance within the indoor area.

19. A system of claim 14, wherein the electronic device is one of a mobile phone, a smart phone, an iPad, and a personal digital assistant.

20. A system of claim 14, wherein the server is coupled to a location database, and is configured to search the location database for the location coordinates of the device, in response to receiving the request signal.

21. A system of claim 14, wherein an indoor location database containing information pertaining to indoor locations proximal to different location coordinates, is coupled to the server, and the server is configured to search the indoor location coordinates of the device, in response to receiving the request signal.

22. An electronic device which is operable to implement a method of claim 1, the device being a desktop computer, a laptop computer, an iPad, or a smart phone, including an iPhone®, an Android® phone or a Symbian® phone.

* * * * *